United States Patent [19]

Muellenberg

[11] Patent Number: 4,702,635
[45] Date of Patent: Oct. 27, 1987

[54] CLAMP APPARATUS FOR CONNECTING MEMBERS HAVING CYLINDRICAL SURFACES

[76] Inventor: Ralph Muellenberg, IM Wiesengrund 6, D-4048 Grevenbroich 12, Fed. Rep. of Germany

[21] Appl. No.: 894,091

[22] Filed: Aug. 7, 1986

Related U.S. Application Data

[63] Continuation of Ser. No. 581,031, Feb. 17, 1984, abandoned.

[30] Foreign Application Priority Data

Feb. 18, 1983 [DE] Fed. Rep. of Germany ....... 3305538

[51] Int. Cl.⁴ .............................................. F16D 1/06
[52] U.S. Cl. ....................................... 403/15; 403/34; 403/368; 403/370; 403/374; 29/446; 29/426.6
[58] Field of Search ...................... 29/426.6, 446, 525; 403/15, 16, 34, 40, 314, 370, 368, 371, 374

[56] References Cited

U.S. PATENT DOCUMENTS

| | | | |
|---|---|---|---|
| 2,764,437 | 9/1956 | Bratt | 403/15 |
| 2,840,399 | 6/1958 | Harless et al. | 29/446 |
| 2,980,474 | 4/1961 | Gargan | 29/446 |
| 3,165,342 | 1/1956 | Anderson | 403/374 |
| 3,865,497 | 2/1975 | Bratt et al. | 403/15 |
| 3,937,103 | 2/1976 | Kleinhans | 403/15 X |
| 3,957,381 | 5/1976 | Schafer | 403/374 |
| 3,958,888 | 5/1976 | Mullenberg | . |
| 3,972,635 | 8/1976 | Peter et al. | 403/13 |
| 3,972,636 | 8/1976 | Peter et al. | 403/370 |
| 3,990,804 | 11/1976 | Peter et al. | 403/374 X |
| 3,998,563 | 12/1976 | Klören | 403/374 X |
| 4,011,019 | 3/1977 | McDonald et al. | 403/15 |
| 4,025,213 | 5/1977 | Schäfer et al. | 403/374 X |
| 4,095,908 | 6/1978 | Schafer et al. | 403/16 |
| 4,105,343 | 8/1978 | Riegler et al. | 403/15 |
| 4,154,543 | 5/1979 | Moewe et al. | 403/15 |
| 4,235,573 | 11/1980 | Peter et al. | 403/370 X |
| 4,268,185 | 5/1981 | Müllenberg | 403/16 |
| 4,304,502 | 12/1981 | Stratienko | 403/370 |
| 4,376,592 | 3/1983 | Martinek | 403/341 X |
| 4,396,310 | 8/1983 | Müllenberg | 403/373 |
| 4,557,621 | 12/1985 | Mullenberg | 403/370 X |
| 4,573,825 | 3/1986 | Müllenberg | 403/374 X |

FOREIGN PATENT DOCUMENTS

| | | |
|---|---|---|
| 1212790 | 3/1966 | Fed. Rep. of Germany . |
| 1294751 | 2/1971 | Fed. Rep. of Germany . |
| 2329940 | 1/1975 | Fed. Rep. of Germany . |
| 7727308 | 1/1978 | Fed. Rep. of Germany . |
| 2734784 | 8/1979 | Fed. Rep. of Germany . |
| 3110294 | 1/1982 | Fed. Rep. of Germany . |
| 1217074 | 12/1970 | United Kingdom . |
| 1339838 | 12/1973 | United Kingdom ................. 403/15 |
| 2026650 | 2/1980 | United Kingdom ............... 403/374 |
| 1586703 | 3/1981 | United Kingdom . |

OTHER PUBLICATIONS

"Druckolverband—SKF", Jun. 1971.

Primary Examiner—Richard J. Scanlan, Jr.
Assistant Examiner—Todd G. Williams
Attorney, Agent, or Firm—Schwartz, Jeffery, Schwaab, Mack, Blumenthal & Evans

[57] ABSTRACT

The clamp apparatus transmits torque forces between a shaft and a hub. The clamp apparatus comprises conical rings, each having a conical surface together with a cylindrical inner or outer circumferential surface. The conical rings are drawn together by axial straining screws, thereby radially expending the clamp apparatus. Surface channels are provided on at least one of the conical surfaces into which a flowable lubricant may be forced under high pressure.

7 Claims, 4 Drawing Figures

CLAMP APPARATUS FOR CONNECTING MEMBERS HAVING CYLINDRICAL SURFACES

This is a continuation of application Ser. No. 581,031, filed Feb. 17, 1984, abandoned.

BACKGROUND OF THE INVENTION

Clamp devices for connecting members having cylindrical surfaces are known in a variety of configurations. For example, DE-OS No. 23 29 940, DE-GM No. 77 27 308 and DE No. 12 94 751 and DE No. 27 34 784 disclose such devices for connecting a cylindrical member to a shaft. These clamp devices may have simple layouts, i.e. with two conical rings arranged radially above each other and capable of being tightened against each other, or multiple configurations, wherein several conical rings are arranged radially above each other or axially in succession to each other, and actuated in this manner. A common feature of all of these is the fact that each clamp device comprises a separate part with a unitary cylindrical outer circumferential surface cooperating with the circumferential surface of a cylindrical bore, and a unitary cylindrical inner circumferential surface, seated on a shaft to be mounted within the bore. The clamp device is arranged in the space between the cylindrical outer circumferential surface of the shaft and the cylindrical inner circumferential surface of the bore. The two structural parts to be clamped, which may be rather large and heavy, do not need to have precise conical surfaces. The latter are present in the clamp set only, which acts outwardly through its cylindrical outer surfaces.

The transmittable torque depends on the frictional lock and thus on the radial stress produced by the clamp device between the inner and the outer structural parts. This stress is generated by the axial stressing force of straining screws connecting the parts of the clamp device. The axial force is converted by way of the conical surfaces into radial expansion of the clamp device. The mechanical strength of the straining screws yields an accurately determined maximum stress that may be applied by the clamp device in the radial direction. As, however, the stress is generated by axial displacement of the different conical rings over their conical or possibly cylindrical surfaces, frictional forces are generated and a significant portion of the existing total stressing force of the straining screws is lost to friction without being converted into a radial stress.

Even though the friction can be reduced by providing cleanly worked displacement surfaces and by oiling the surfaces with lubricants such as molybdenum disulfide, heretofore, there was always a certain metallic friction generated between the rings by the radial pressure. This friction results in correspondingly high losses of the stressing force of the screws during the axial displacement.

SUMMARY OF THE INVENTION

An object of the present invention is to provide a clamping apparatus which can connect a member having a cylindrical outer surface to a member having a cylindrical inner surface.

Another object of the present invention is to provide a clamp apparatus wherein frictional losses are reduced so that the apparatus operates more easily and effectively.

A further object of the present invention is to provide a clamp apparatus which is relatively simple to construct yet is reliable and durable in use.

In accordance with the above objects, the present invention is a clamp apparatus for transmitting torque forces between an inner structural element having a cylindrical outer circumferential surface and an outer structural element having a cylindrical inner circumferential surface. The apparatus comprises a first conical ring having a cylindrical outer surface to rest against the inner circumferential surface of the outer structural element, and a sloping conical inner surface. A second conical ring is provided cooperating with the first ring. The second conical ring has a cylindrical inner surface to rest against the outer circumferential surface of the inner structural element, and a sloping conical outer surface complementary to the sloping conical inner surface. Means are provided for drawing the conical rings axially against each other such that the sloping conical surfaces ride along each other and the rings are radially pressed apart while sliding over the conical surfaces of the cylindrical outer and inner circumferential surfaces. A plurality of surface channels with a small cross section are formed on at least one of the sloping conical surfaces. The surface channels are capable of being connected with a source of a flowable lubricant under a high pressure.

In accordance with other aspects of the invention, the apparatus includes at least one cylindrical bushing positioned between the cylindrical circumferential surface of one of the conical rings and the cylindrical circumferential surface of one of the structural elements, and a plurality of low cross section surface channels are formed on the cylindrical circumferential surface of the one conical ring.

The flowable lubricant, which may be liquid, gel or the like in the form of a paste, is pressured into the surface channels and enters over the edges of the channels between the adjacent conical or cylindrical surfaces displacing each other. The lubricant creates a coherent sliding layer upon which the rings may displace each other with a substantially lesser friction than in conventional clamp devices wherein metallic friction occurs even when the surfaces have been lubricated prior to their fitting. According to the invention, the lubricant is not pressured away or pressed back into the recesses, but the coherent lubricating layer is maintained by the constant force of a high pressure. The pressure of the lubricant, if the aforedescribed effect is to be achieved, must be slightly higher than the surface pressure of the pair of surfaces to be fitted. Thus, pressure on the order of magnitude of up to approximately 30 kg/mm$^2$, i.e. on the order of 3000 bar, are used.

The effect of high pressure lubrication on the displacement surfaces is a multiple one. Because of the reduced frictional losses, greater proportions of the screw stressing force may be converted to a radial stress, i.e. the transferable torque is increased. Thus, the size of the clamp apparatus may be reduced or fewer straining screws may be used to produce the same clamping effect as in prior devices. In principle, the invention is applicable both to clamp devices with self-locking and non-self-locking conical surfaces. If especially high transmittable torque forces are to be generated, obviously clamp devices with self-locking surfaces are used. These clamp devices are not released automatically upon the loosening of the straining screws. The application of high oil pressures during the releasing process significantly facilitates the axial set back. In this case, the configuration according to the invention serves as a dismantling aid.

For some time, the so-called pressure oil joint (see the SKF pamphlet "Pressure Oil Joint", June 1971) has been used. This, however, always involves the direct joining of the structural parts to be fitted. Therefore, to the extent that conical surfaces are used, at least one of the structural parts itself must carry such a surface. Furthermore, the surface channels and the corresponding feed lines must be housed in the part itself. This may become a major problem in the case of large structural parts, for example, shafts with diameters of 500 mm or more of belt drive drums for belt conveyors, such as those used in the surface mining of brown coal.

The invention may further be viewed as utilizing the advantages of the pressure oil joint, without the need for special configurations of the structural parts to be connected with each other. These parts need only to have cylindrical external or internal surfaces, with no special requirements concerning their surface quality, as the clamp apparatus seated on or in them is displaced only within itself, while no axial displacement of the clamp apparatus takes place with respect to the adjacent surface. The surfaces of the structural parts serve only to transmit the radial forces applied by the clamp apparatus. The clamp apparatus is thus a separate structural part, closed in itself and ready for installation.

If a certain clamp apparatus configuration comprises several conical surfaces arranged radially above each other, the surface channels may obviously be present in all of the displacement surfaces. In layouts, wherein axial displacement upon the tightening of the straining screws takes place not only on the conical surfaces, but simultaneously also on cylindrical displacement surfaces, the latter may also be equipped with surface channels.

BRIEF DESCRIPTION OF THE DRAWINGS

The above and other objects of the invention will become more readily apparent as the invention becomes more fully understood from the detailed description to follow, reference being had to the accompanying drawings in which like reference numerals represent like parts throughout, and in which.

DETAILED DESCRIPTION OF THE PREFERRED EMBODIMENTS

Figure 1:
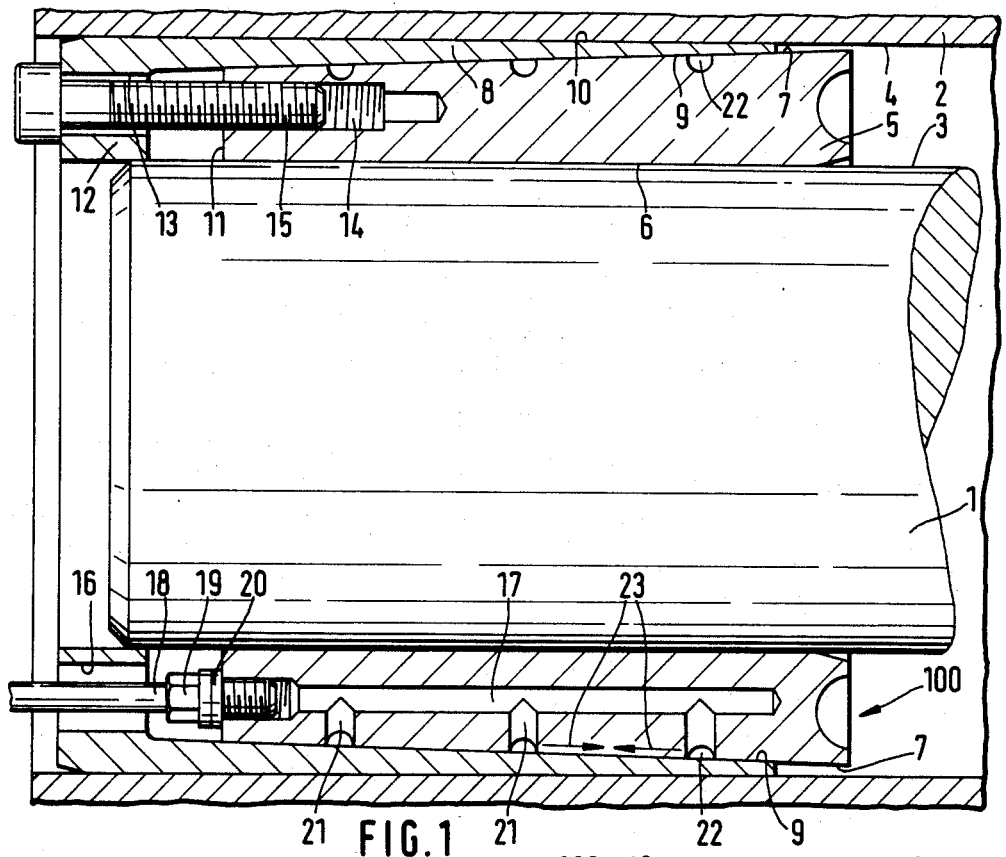
FIG. 1 is a longitudinal sectional view showing a clamping apparatus of the present invention connecting a shaft to an outer member.

As shown in FIG. 1, the purpose of the clamp apparatus 100 is to mount an external structural part in the form of a hub 2 on an internal structural element in the form of a shaft 1. The shaft 1 has a cylindrical outer circumferential surface 3 and the hub has a cylindrical inner circumferential surface 4.

The clamp apparatus 100 comprises an inner conical ring 5 with a cylindrical internal circumferential surface 6, which rests against the cylindrical outer circumferential surface 3 of the shaft 1. The conical ring 5 has a conical outer circumferential surface 7, which, in the present example, has a cone angle of 2 degrees. The outer conical ring 8 has a conical inner circumferential surface 9, with the same cone angle as the outer circumferential surface 7 of inner conical ring 5, and rests against the surface 7 on the outside. The outer circumferential surface 10 of the conical ring 8 is cylindrical and rests against the inner circumferential surface 4 of the hub 2.

At the thick walled end of the outer conical ring 8, a flange 12 is provided protruding from the inside in front of the frontal surface 11 of the conical ring 5. The flange 12 has a plurality of passage holes 13, with which the threaded bores 14 in the frontal side 11 of the conical ring 5 are aligned. Straining screws 15 are screwed through the passage holes 13 into the threaded bores 14. Screws 15 are parallel to the axes of conical rings 5 and 8, and displace the conical rings 5, 8 axially. This action tightens the conical rings while also expanding them radially over the conical surfaces 7, 9. The hub is thereby immobilized on the shaft 1 by frictional locking.

The straining screws 15 are distributed over the circumference of the clamp apparatus 100. At a location without straining screws, a passage bore 16 is provided in the flange 12. Bore 16 is aligned with a longitudinal bore 17 in the conical ring 5. A high pressure line 18 is passed through the bore 16 and is connected to bore 17 through a threaded fitting 19 and a gasket 20. Three branch channels 21 extend from the longitudinal bore 17. Channels 21 open into the surface channels 22, which extend in the circumferential direction. The surface channels have cross sections of flat circular arcs and are approximately 0.5 to 1 mm deep. Their spacing in the axial direction depends on the size of the clamp apparatus. In a larger clamp apparatus, obviously, more surface channels 22 may be provided.

If the longitudinal bore 17 and thus the surface channels 22 are supplied through the line 18 with a flowable lubricant under a high pressure, for example, oil, the latter expands along the conical surfaces 7, 9, as indicated in the bottom part of FIG. 1 by the arrows 23. On the displacement surface formed by the pair of conical surfaces 7, 9 a coherent liquid layer is created. Conical surfaces 7 and 9 slide on this layer. The friction on the conical surfaces 7 and 9 is thus reduced during the tightening of the straining screws. The release of the clamp set 100 may also be facilitated by the application of pressurized oil.

In the clamp apparatus 100 of FIG. 1, axial displacement of structural elements during clamping takes place along the conical surfaces 7 and 9 only. This naturally results in a slight shifting of the hub 2 with respect to the shaft during tightening. In numerous cases this is immaterial or it may be taken into consideration to a great extent beforehand.

Figures 2, 3:
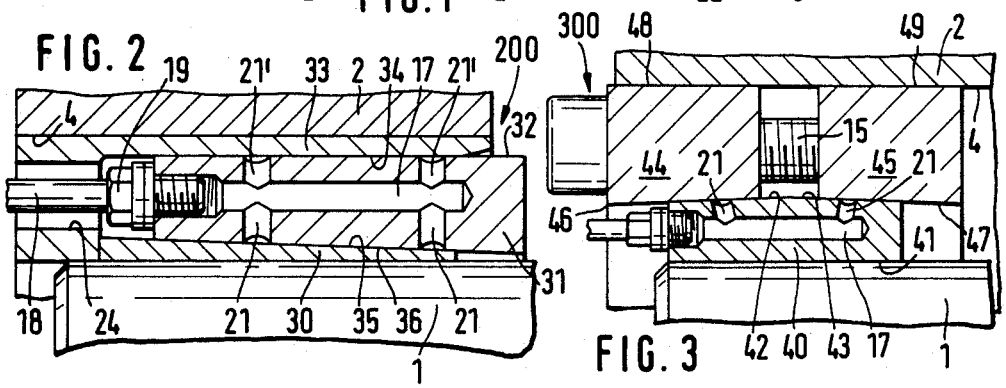
FIG. 2 is a longitudinal sectional view showing the upper portion of second embodiment of the apparatus of the present invention.
FIG. 3 is a longitudinal sectional view showing the upper portion of a third embodiment of the apparatus of the present invention.

However, in FIG. 2, an embodiment 200 is shown, whereby no axial displacement of the hub 2 takes place with respect to the shaft 1. A thin walled inner conical ring 30 is provided. Ring 30 rests with its cylindrical inner circumferential surface on the shaft 1 and cooperates with an outer conical ring 31. Conical ring 31 has a cylindrical outer circumferential surface 32. A cylindrical bushing 33 has an inner circumferential surface 34 resting on the outer circumferential surface 32. Bushing 33 has an outer circumferential surface abutting against the bore 4 of the hub 2. The cylindrical bushing 33 has a flange extending radially inward to a position in front of the thicker end of the thin walled bushing 30. Upon tightening the straining screws, not shown, displacement takes place along the outer conical circumferential surface 35 of the conical ring 30 and the inner conical circumferential surface 36 of the conical ring 31, and along the cylindrical outer circumferential surface 32 of the conical ring 31 and the cylindrical inner circumferential surface 34 of the cylindrical bushing 33. For this reason, not only are branch channels 21 provided leading to the conical surfaces 35, 36, but also branch channels 21' are provided leading to the cylindrical surfaces 32, 34.

No mutual axial displacement of the hub 2 and the shaft 1 takes place here, because the inner conical ring 30 rests against the flange of the cylindrical bushing 33 and the displacements remain entirely within the clamp apparatus 200.

FIG. 3 shows an embodiment 300, including a double conical inner ring 40. Ring 40 includes a cylindrical inner circumferential surface 41 seated on the shaft 1 and is provided with two opposing conical outer circumferential surfaces 42, 43. Surfaces 42 and 43 are oriented such that the thickest part of ring 40 is located in the center. Two outer conical rings 44, 45 include inner conical surfaces 46, 47, respectively, which are arranged on the double conical ring 40. Rings 44, 45 also include outer cylindrical circumferential surfaces 48, 49, respectively, which rest in the bore 4 of the hub 2. The outer conical rings 44, 45 are slit in one location in a longitudinal plane passing through their axis, so that not too much force is lost when the straining screws 15 are tightened to pull the conical rings 44, 45 together. The longitudinal bore 17 is located in the clamp apparatus 300 in the inner double conical ring 40 and opens through the branch channels 21 onto the conical surfaces 42, 43.

Figure 4:
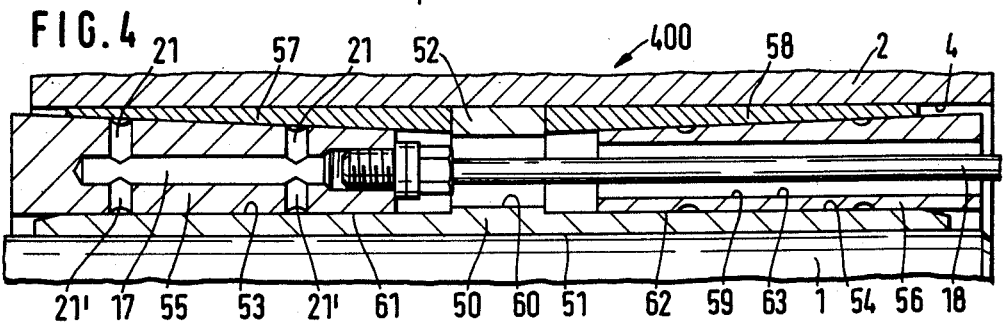
FIG. 4 is a longitudinal sectional view showing the upper portion of a fourth embodiment of the apparatus of the present invention.

The embodiment 400 shown in FIG. 4 includes a cylindrical bushing 50 seated on the shaft 1. Bushing 50 has a cylindrical inner circumferential surface 51 abutting against the shaft 1. The bushing 50 has a shoulder 52 protruding in the radially outward direction and is traversed by the straining screws, not shown, in passage bores. The bushing 50 has cylindrical outer circumferential surfaces 53, 54, formed on either side of the shoulder 52. The inner conical rings 55, 56 are arranged on surfaces 53, 54. Rings 55, 56 have conical outer circumferential surfaces cooperating with the conical inner circumferential surfaces of two thin-walled outer conical rings 57, 58, respectively, resting with their cylindrical outer circumferential surfaces against the inner circumferential surface 4 of the hub 2. The straining screws, not shown, act in a manner similar to those of embodiment 300. That is, the straining screws extend between the conical rings 55, 56 and draw them together in the axial direction, whereby no displacement of the hub 2 with respect to the shaft 1 takes place. In the embodiment of FIG. 4, the straining screws are tightened from the right. This is the access side. FIG. 4 shows the manner in which the high pressure line 18 is passed through a passage, formed in a portion bore 59 of the conical ring 56 facing the access location, to reach the conical ring 55 (shown in the left in FIG. 4). Branch channels 21 are provided to the conical surface and branch channels 21' are provided to the cylindrical surface of the conical rings 55, 56. The right hand conical ring 56 is supplied by a high pressure line located elsewhere, which, in the manner of the embodiment 300, may be connected directly with the conical ring 56.

It should be understood that if the existing cone surfaces are self-locking, axial threaded bores, not shown, are provided (in the present case in the parts 12, 31, 50, 56), in which forcing screws may be received. The forcing screws are set against the frontal surfaces of the adjacent conical rings or the shoulder 52 whereby the conical rings may be pressured apart axially, while overcoming the radial stress, in order to release the clamp connection.

Before putting on the high pressure, the conical surfaces containing surface channels are drawn against each other axially to a certain extent by the clamping screws in order to obtain tightness to build up a considerable pressure.

The high pressure on the flowable lubricant in the surface channels is maintained during the fastening operation and, if necessary, during the releasing operation, i.e. as long as the straining screws are tightened or the releasing screws, respectively. The pressure may be held essentially constant but may also be varied according to a predetermined program. After these operations, i.e. in use of the clamp connection, the pressure is, of course, taken away. After the tightening has been terminated, the cooperating surfaces previously exposed to the pressure are given some time (i.e. up to several hours) to "settle", during which time the flowable lubricant layer breaks down and the remaining lubricant enters into pores of the cooperating surfaces or emerges at the split at their ends, so that an at least essentially metallic contact between the cooperating surfaces is achieved.

One of the most important features of the invention resides in the clamp apparatus being a self-contained separate unit, which may be produced and finely machined at a different place as the structural elements to be clampingly connected. These only need to have cylindrical surfaces of modest precision and finish, which is an important advantage for heavy parts, for example belt conveyor drums and shafts for which the invention may be used.

The foregoing description is provided to illustrate the present invention but is not meant to limit the scope thereof. Clearly, numerous additions, substitutions and other changes can be made to the invention without departing from the scope thereof, as set forth in the appended claims.

What is claimed is:

1. A replaceable clamp unit for exerting clamping forces between an inner structural element having a cylindrical outer circumferential surface and an outer structural element having a cylindrical inner circumferential surface, said unit comprising:

a first conical ring having a cylindrical outer surface adapted to rest against an inner circumferential surface of an outer structural element, said first conical ring having a sloping conical inner surface;

a second conical ring cooperating with said first ring, said second conical ring having a cylindrical inner surface adapted to rest against an outer circumferential surface of an inner structural element, and a sloping conical outer surface complementary to said sloping conical inner surface;

axial threaded means for drawing at least one of said conical rings axially relative to each other such that said sloping conical surfaces ride along each other, whereby upon threading of said axial threaded means said conical rings may be brought from an untensioned condition to a tensioned condition wherein said rings exert radial clamping forces upon said inner and outer structural elements; and means for increasing said radial clamping forces comprising a plurality of surface channels formed on at least one of said surfaces and means for communicating said surface channels with a source of a flowable lubricant under a high pressure for reducing friction when said conical rings are drawn axially relative to each other during tensioning;

said communicating means including an inlet axially directed into at least one of said conical rings, said axial tensioning means operative with said conical rings so that said axial tensioning means and conical surfaces maintain all of said conical rings proximate to one another in both said tensioned and untensioned conditions, so that said clamp unit may be inserted and removed from between the inner and outer structural elements as a unit in an untensioned condition.

2. A clamp unit according to claim 1 including at least one cylindrical bushing positioned between the cylindrical circumferential surface of one of the conical rings and the cylindrical circumferential surface of one of the structural elements, and a plurality of low cross section surface channels formed on said cylindrical circumferential surface of said one conical ring and being capable of being connected with a source of a flowable lubricant under a higher pressure.

3. A clamp unit according to claim 1 including a longitudinal bore formed in one of said conical rings, and radial branch channels leading from said longitudinal bore to several of said surface channels, and wherein said longitudinal bore is accessible externally of said one conical ring.

4. A clamp unit according to claim 3 wherein said longitudinal bore extends to a frontal surface of said one conical ring, and a flange is located in front of said frontal surface, a continuous access bore being provided in said flange.

5. A clamp unit according to claim 2 including a longitudinal bore formed in said one conical ring, and radial branch channels leading from said longitudinal bore to said surface channels.

6. A clamp unit according to claim 5 wherein said longitudinal bore extends to a frontal surface of said one conical ring, and a flange is located in front of said frontal surface, a continuous access bore being provided in said flange.

7. A clamp unit according to claim 1 wherein said drawing means comprises screws connected to draw said rings axially toward one another.

* * * * *